(12) United States Patent
Jack et al.

(10) Patent No.: US 11,835,484 B2
(45) Date of Patent: Dec. 5, 2023

(54) CYLINDRICAL ULTRASONIC SCANNING APPARATUS

(71) Applicant: Verifi Technologies, LLC, Waco, TX (US)

(72) Inventors: David A. Jack, Waco, TX (US); Benjamin M. Blandford, Waco, TX (US); Pruthul Kokkada Ravindranath, Waco, TX (US); Nathaniel J. Blackman, Hewitt, TX (US); Daniel Pulipati, Waco, TX (US); Ian Gravagne, Waco, TX (US)

(73) Assignee: VERIFI TECHNOLOGIES, LLC, Waco, TX (US)

( * ) Notice: Subject to any disclaimer, the term of this patent is extended or adjusted under 35 U.S.C. 154(b) by 0 days.

(21) Appl. No.: 17/525,326

(22) Filed: Nov. 12, 2021

(65) Prior Publication Data

US 2022/0412921 A1    Dec. 29, 2022

Related U.S. Application Data

(63) Continuation of application No. 17/362,342, filed on Jun. 29, 2021.

(51) Int. Cl.
*G01N 29/06* (2006.01)
*G01N 29/28* (2006.01)
*G01N 29/265* (2006.01)
*G01D 5/14* (2006.01)

(52) U.S. Cl.
CPC .......... *G01N 29/0654* (2013.01); *G01D 5/14* (2013.01); *G01N 29/265* (2013.01); *G01N 29/28* (2013.01); *G01N 2291/0289* (2013.01); *G01N 2291/02854* (2013.01); *G01N 2291/2698* (2013.01)

(58) Field of Classification Search
CPC .. G01N 29/0654; G01N 29/265; G01N 29/28; G01N 2291/02854; G01N 2291/0289; G01N 2291/2698; G01D 5/14
See application file for complete search history.

(56) References Cited

U.S. PATENT DOCUMENTS

| | | | |
|---|---|---|---|
| 4,429,577 A * | 2/1984 | Sorenson | A61B 8/4209 73/644 |
| 5,007,291 A | 4/1991 | Walters et al. | |
| 6,341,525 B1 * | 1/2002 | Takada | G01N 29/2487 73/620 |
| 7,240,556 B2 | 7/2007 | Georgeson et al. | |
| 7,685,878 B2 | 3/2010 | Brandstrom | |
| 8,365,603 B2 | 2/2013 | Lesage et al. | |

(Continued)

*Primary Examiner* — Xin Y Zhong
(74) *Attorney, Agent, or Firm* — NEO IP

(57) ABSTRACT

An apparatus for scanning a cylindrical part is provided. The apparatus includes an ultrasonic transducer operable to emit ultrasonic waves into and receive ultrasonic waves from the part, with the ultrasonic transducer connected to a translation stage to move it up and down the part and around the circumference of the part. The apparatus does not mechanically contact the cylindrical or maintains contact only with soft elements, such that the apparatus does not damage sensitive parts. The apparatus also contains no magnetic parts, nor any elements that rely on magnetic detection, such that the apparatus is capable of being used in the vicinity of a part exhibiting a strong magnetic field.

20 Claims, 11 Drawing Sheets
(3 of 11 Drawing Sheet(s) Filed in Color)

(56) References Cited

U.S. PATENT DOCUMENTS

| | | | |
|---|---|---|---|
| 8,798,940 B2 | 8/2014 | Imbert et al. | |
| 9,970,907 B2 | 5/2018 | Grotenhuis et al. | |
| 2006/0042391 A1 | 3/2006 | Georgeson et al. | |
| 2006/0063473 A1* | 3/2006 | Blake | G01N 29/0609 451/8 |
| 2010/0307249 A1* | 12/2010 | Lesage | G01N 29/4481 73/623 |
| 2015/0329221 A1* | 11/2015 | Georgeson | H04W 72/0446 702/36 |
| 2017/0284971 A1* | 10/2017 | Hall | G01N 29/28 |
| 2018/0284072 A1* | 10/2018 | Pfortje | G01N 29/28 |
| 2019/0077472 A1 | 3/2019 | Harris et al. | |
| 2020/0057032 A1* | 2/2020 | Matsumoto | G01N 29/265 |
| 2020/0232951 A1* | 7/2020 | Fetzer | B25J 5/00 |

\* cited by examiner

CYLINDRICAL ULTRASONIC SCANNING APPARATUS

CROSS-REFERENCES TO RELATED APPLICATIONS

This application relates to and claims priority from the following U.S. patent applications. This application is a continuation of U.S. patent application Ser. No. 17/362,342, filed Jun. 29, 2021. Each of the above-mentioned applications is incorporated herein by reference in its entirety.

BACKGROUND OF THE INVENTION

1. Field of the Invention

The present invention relates to ultrasonic non-destructive testing systems, and more specifically to systems for high resolution scanning cylindrical or tubular parts.

2. Description of the Prior Art

It is generally known in the prior art to provide systems for scanning a part with ultrasonic energy. Systems exist for scanning parts both in and out of immersion tanks and are operable to scan parts having a variety of geometries, including cylindrical parts.

Prior art patent documents include the following:

U.S. Pat. No. 8,798,940 for Rotating array probe systems for non-destructive testing by inventors Imbert et al., filed Apr. 11, 2011 and issued Aug. 5, 2014, discusses performing non-destructive inspection and testing (NDT/NDI) of an elongated test object, wherein the inspection system includes: a test object conveyor for conveying the test object along a longitudinal conveyance path; a probe assembly including phased-array probes, the probe assembly being configured to induce signals in the test object and sense echoes reflected from the test object; a probe assembly conveyor configured to movably support the probe assembly, to move the probe assembly on a circumferential path about the test object; and a control system coupled to the test object conveyor and to the probe assembly conveyor and configured to allow data acquisition by and from the phased-array probes while, simultaneously, the test object moves along the longitudinal path and the phased-array probes move on the circumferential path. The test system may include phased-array probes of different types to optimize detecting faults or cracks in the test object which extend in different directions.

U.S. Pat. No. 9,970,907 for Ultrasonic matrix inspection by inventors Grotenhuis et al., filed Sep. 26, 2012 and issued May 15, 2018, discusses a device and method for performing ultrasound scanning of a substantially cylindrical object, the device comprising a cuff adapted to fit around a circumference of the object, a carrier mounted slidably on the cuff and adapted to traverse the circumference of the object, an ultrasound probe mounted on the carrier and positioned to scan the circumference of the object as the carrier traverses the circumference of the object, a carrier motor mounted on the cuff or the carrier and used to drive the movement of the carrier about the circumference of the object, and one or more data connections providing control information for the carrier motor and the ultrasound probe and receiving scanning data from the ultrasound probe.

U.S. Pat. No. 7,685,878 for Apparatus for structural testing of a cylindrical body by inventor Brandstrom, filed Jul. 25, 2007 and issued Mar. 30, 2010, discusses two transducers to be rotated around a circumferential location on a cylindrical body for structural testing of the body, which are carried on a mounting and drive apparatus including a magnetic attachment which can be manually brought up to a pipe from one side only for fixed connection to the pipe on that side at a position axially spaced from a weld. A collar shaped support for the pair of transducers is formed of a row of separate segments which wrap around the pipe from the one side and is rotated around the axis of the pipe to carry the transducer around the circumferential weld. The segments carry rollers to roll on the surface and are held against the pipe by magnets. The transducers are carried on the support in fixed angular position to track their position but in a manner which allows slight axial or radial movement relative to the pipe.

U.S. Pat. No. 7,240,556 for Angle beam shear wave through-transmission ultrasonic testing apparatus and method by inventors Georgeson et al., filed Mar. 14, 2005 and issued Jul. 10, 2007, discusses methods, systems, and an apparatus for inspecting a structure using angle beam shear wave through-transmission ultrasonic signals involves positioning transducers at offset positions on opposing sides of the structure and permits inspection of the inside of the structure beneath surface defects and features. Magnetic coupling can be used for supporting a pair of leader-follower probes and defining offset positions between angle beam shear wave transducers carried by the probes. Inspection data can be collected for supporting real-time generation of three-dimensional image representations of the structure and of internal defects and features of the structure. Image generation and resolution using inspection data from angle beam shear wave ultrasonic signals can be supplemented using pulse-echo ultrasonic inspection data.

U.S. Pat. No. 8,365,603 for Non-destructive testing, in particular for pipes during manufacture or in the finished state by inventors Lesage et al., filed Dec. 16, 2008 and issued Feb. 5, 2013, discusses a device forming an operating tool, for the non-destructive testing of iron and steel products, intended to extract information on possible imperfections in the product, from feedback signals that are captured by transmitting ultrasound sensors, receiving ultrasound sensors forming an arrangement with a selected geometry, assembled to couple in an ultrasound way with the product via the intermediary of a liquid medium, with relative rotation/translation movement between the pipe and the arrangement of transducers, said operating tool being characterized in that it comprises: a converter capable of selectively isolating a digital representation of possible echoes in designated time windows, as a function of the relative rotation/translation movement, said representation comprising the amplitude and time of flight of at least one echo, and of generating a parallelepipedic 3D graph, a transformer unit capable of generating a 3D image of possible imperfections in the pipe from the 3D graph and a database, a filter capable of determining, in the images, presumed imperfection zones, and the properties of each presumed imperfection, and an output stage configured to generate a product conformity or non-conformity signal.

U.S. Pat. No. 5,007,291 for Ultrasonic inspection apparatus with centering means for tubular members by inventors Walters et al., filed Oct. 5, 1989 and issued Apr. 16, 1991, discusses a pipe inspection apparatus comprising transducers for transmitting pulsed beams of ultrasonic energy longitudinally, transversely and obliquely into the wall of the pipe for detection of flaws. The apparatus includes a motor driven chuck for rotating the transducers about the pipe P and motor driven roller for axial movement of the pipe whereby the transducers move in a helical scanning path. A control system maintains the axes of the pipe and circle array of transducers in coincidence and with hydraulic controls maintains each transducer at fixed distance to the pipe for sonically coupling thereto by a flowing liquid whereby a shear wave is generated by each beam in the tubular wall. The transducers comprise multiple pairs, the members of which are diametrically opposed and transmit in opposite directions, for transmitting longitudinally at angles of 12°, 27° and 42° to the pipe axis both clockwise and counterclockwise with one transducer of each pair disposed to transmit forward and the other reverse. For longitudinal flaws, one transducer of a pair transmits transverse clockwise and the other transverse counterclockwise. All transducers which transmit in a given direction are arrayed in the axial direction of the pipe. Pulsers simultaneously and repetitively energize and de-energize all forward transmitting transducers and after each such transmission pulsers simultaneously and repetitively energize and de-energize all reverse transducers. Reflection signals of predetermined strength are recorded and activate an alarm. A compressional wave transducer for determining wall thickness is included.

US Patent Publication No. 2019/0077472 for Surface wave detection of surface defects by inventors Harris et al., filed Mar. 20, 2017 and published Mar. 14, 2019, discusses a moving robot having at least one surface wave transducer or a transmitter and receiver, to identify defects on or in a surface on which the robot moves, and provide data indicative of the location, size and/or orientation of the defects from robot position data.

SUMMARY OF THE INVENTION

The present invention relates to ultrasonic non-destructive testing systems, and more specifically to systems for scanning cylindrical or tubular parts.

It is an object of this invention to scan sensitive parts using ultrasonic energy in a highly magnetic environment.

In one embodiment, the present invention is directed to an apparatus for performing ultrasonic inspection of a substantially cylindrical part, wherein the apparatus does not contact the substantially cylindrical part.

These and other aspects of the present invention will become apparent to those skilled in the art after a reading of the following description of the preferred embodiment when considered with the drawings, as they support the claimed invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
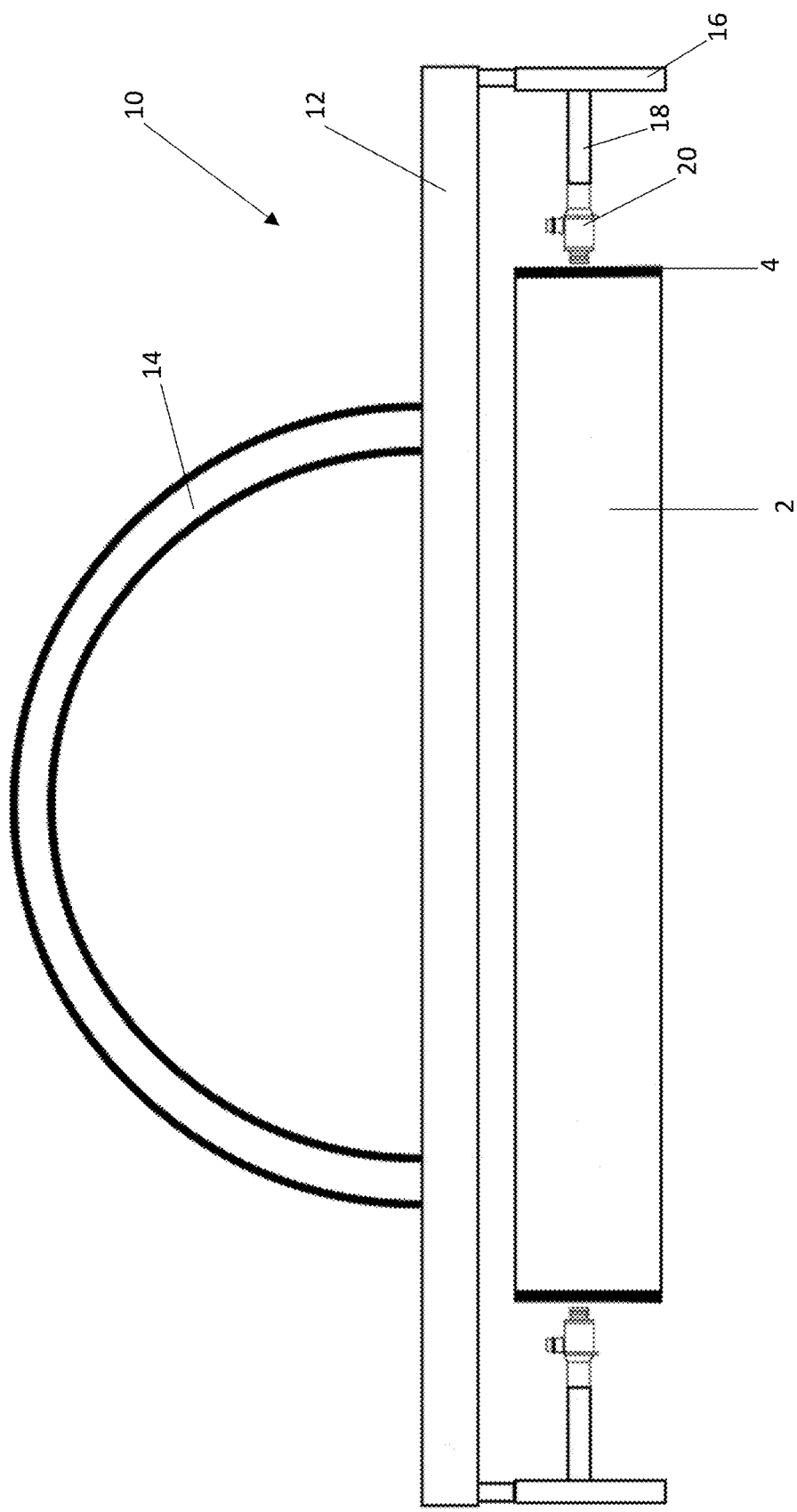
FIG. 1 illustrates a side view of an ultrasonic scanning apparatus according to one embodiment of the present invention.

The present invention is generally directed to ultrasonic non-destructive testing systems, and more specifically to systems for scanning cylindrical or tubular parts.

In one embodiment, the present invention is directed to an apparatus for performing ultrasonic inspection of a substantially cylindrical part, wherein the apparatus does not contact the substantially cylindrical part.

None of the prior art discloses an ultrasonic scanning apparatus for sensitive cylindrical parts. For scanning cylindrical parts, a central challenge is maintaining the transducer at a relatively consistent angle relative to the surface of the part and at a relatively consistent distance from the surface of the part, so that the data is more readily interpretable. Existing scanning systems for cylindrical parts attempt to accomplish this in two main ways. First, systems such as that disclosed in U.S. Pat. No. 9,970,907 require that a transducer be attached to be a brace that clamps onto the cylindrical part and holds the transducer tightly against it. Because the clamp is directly attached to the part and the transducer is rotatable in an arc around the clamp, the transducer maintains a substantially fixed orientation relative to the surface of the part. However, while many pipes, for example, are able to maintain an attached piece with any issues, other parts are more sensitive and likely to be damaged by clamping or any other mechanism that involves substantial contact with the part. However, transducers used in these systems are flat-front transducers, which require the transducer to be almost perfectly normal to the surface of the part in order to get interpretable readings.

Other systems utilize a mobile apparatus that is able to be pressed against a part in order to keep an attached transducer at a substantially fixed orientation relative to the surface of a part. For example, the roller in U.S. Patent Pub. No. 2019/0077472 requires that wheels be pressed against the part being tested in order to maintain the transducer at a relatively consistent angle and distance from the cylindrical part. Some roller systems utilize a phased array of transducers to focus a beam of ultrasonic energy on the part to be scanned. However, the tolerances and resolution of such systems are low. Typically, the frequency of such transducers is fairly low. Additionally, the fact that the transducers are so close to the part means that the system is unable to be sufficiently focus with enough precision to produce useful data for many applications, such as characterizing defects in individual lamina. Additionally, phased array systems run at approximately 50 V, which limits the resolution power they are capable of having. Further, roller probes need to be refocused for each depth to be examined, as the system needs to ensure that shear waves or reflections of angled waves off the surface of the part do not impact the waveform.

Furthermore, both types of existing cylindrical systems require that the system either be immersed in a water-filled tank or that water be continuously run over or through the part in order to couple the transducer to the part. However, immersion tanks and/or water jets are impractical or even potentially damaging for certain parts. Alternatively, if a flat-front contact transducer is substituted in place of a water-coupled transducer, then the immersion tank or continuous stream is avoided, but the x-y resolution of the transducer is greatly reduced, causing the apparatus to have limited usefulness in determining flaws in the part being scanned. Therefore, a system is needed for cylindrical parts without the use of an immersion tank.

Additionally, existing scanning systems include magnetic components, and frequently employ a magnetic encoder in order to detect the rotational position of the scanning device. However, some parts that need to be tested, for instance, parts of an electric motor, generate large magnetic fields that make using the majority of scanning apparatuses practically impossible. Existing scanning apparatuses have typically avoided using replacements for magnetic encoders, such as optical encoders, as alternatives tend to have issues if the scanning apparatus is moving too fast. Optical encoders provide information regarding relative position of a device, only comparable to the most recently measured position, while magnetic encoders are capable of providing an objective position. Additionally, addressing the susceptibility of scanning apparatuses to external magnetic fields would require that the scanning apparatuses remove magnetic metal elements from the system entirely. Elements made from steel and other magnetic metals are all too common in existing scanning systems, making those systems unsuitable for scanning in the presence of an external magnetic field. Therefore, a system is needed that is capable of scanning parts in a magnetic environment.

Referring now to the drawings in general, the illustrations are for the purpose of describing one or more preferred embodiments of the invention and are not intended to limit the invention thereto.

FIG. 1 illustrates a side view of an ultrasonic scanning apparatus according to one embodiment of the present invention. The ultrasonic scanning apparatus 10 is supported above a part 2 having an outer coating 4. In one embodiment, the part 2 is substantially axisymmetric (e.g. cylindrical). In one embodiment, the part 2 has a diameter of 100 mm or greater. In another embodiment, the part 2 has a diameter between 100 mm and 3000 mm. In yet another embodiment, the part is between about 200 mm and 61 cm in diameter. In still another embodiment, the part 2 has a diameter between about 300 mm and 500 mm. In another embodiment, the part has a diameter of approximately 460 mm. In one embodiment, the outer coating 4 of the part 2 is made from a sensitive material, such as one or more layers of carbon fiber, especially when the carbon fibers are exposed to the surface of the outer coating 4. The ultrasonic scanning apparatus 10 does not contact the part 2 in any way, with special care taken to not contact the outer coating 4 of the part 2.

In embodiment, the ultrasonic scanning apparatus 10 includes a ring base 12. At least one translation stage 16 extends axially downwardly from the ring base 12. In one embodiment, the at least one translation stage 16 is rotatable around a track within the ring base 12, such that the at least one translation stage 16 is able to move partly around the ring base 12 or move fully around the ring base 12. In one embodiment, the ultrasonic scanning apparatus 10 includes at least one locking mechanism, operable to lock each translation stage 16 in a fixed position on the track of the ring base 12. In another embodiment, the at least one translation stage 16 is moved around the ring base 12 by at least one stepper motor and is configured to not move relative to the ring base 12 without action of the at least one stepper motor. Each of the at least one translation stage 16 is connected to at least one extension arm 18, which extends radially inwardly from the translation stage 16. Each of the at least one extension arm 18 is connected to a transducer housing assembly 20, which includes a fluid-filled chamber containing an ultrasonic transducer. In one embodiment, at least one transducer housing assembly 20 attaches directing to the at least one translation stage 16 without connection to an extension arm 18. For example, in one embodiment, the at least one transducer housing assembly 20 is attached to the translation stag 16 via a hinge. Each transducer housing assembly 20 is connected to a processor, which is operable to record and analyze the results of all scans performed by the ultrasonic scanning apparatus 10. In one embodiment, the processor includes at least one pulser receiver, operable to receive ultrasonic transducer signals and generate a waveform for a scan. The at least one translation stage 16 is able to move the at least one extension arm 18, and, by extension, the connected transducer housing assembly 20 axially upwardly or downwardly relative to the part 2. Therefore, moving the at least one extension arm 18 with respect to the at least one translation stage 16 allows the ultrasonic scanning apparatus 10 to scan at different axial positions of the outer coating 4 of the part 2, while moving the at least one translation stage 16 radially around the ring base 12 allows the ultrasonic scanning apparatus 10 to scan at different radial positions of the outer coating 4 of the part 2.

In one embodiment, the at least one translation stage 16 includes at least two translation stages, at least three translation stages, at least four translation stages, at least five translation stages, at least seven translation stages, at least eight translation stages, at least ten translation stages, or at least twenty translation stages. In another embodiment, the at least one transducer housing assembly 20 includes at least two transducer housing assemblies, at least three transducer housing assemblies, at least four transducer housing assemblies, at least five transducer housing assemblies, at least seven transducer housing assemblies, at least eight transducer housing assemblies, at least ten transducer housing assemblies, or at least twenty transducer housing assemblies attached to each of the at least one translation stage 16. It will be appreciated that individual translation stages 16 are capable of having different numbers of attached transducer housing assemblies 20.

In another embodiment, the base of the ultrasonic scanning apparatus 10 does not include a track. Instead, in one embodiment, the base of the ultrasonic scanning apparatus 10 is able to be rotated around the part 2, such that the at least one transducer housing assembly 20 is aimed at different locations on the part. In this embodiment, the base is able to be a ring, or is able to formed as a variety of other shapes, including, but not limited to, a single crossbar positioned over the part 2 or a cross-shaped system.

When the ultrasonic scanning apparatus 10 is positioned above the part 2, the transducer housing assembly 20 is positioned proximate to (e.g., 1 mm away from) the outer coating 4 of the part 2. In one embodiment, the transducer housing assembly 20 is placed at about 0.5 mm to about 2 mm off the surface of the outer coating 4 of the part 2, depending on the thickness of the outer coating. In one embodiment, the position of the transducer housing assembly 20 relative to the outer coating is maintained at a substantially consistent offset, wherein the offset does not increase and/or decrease by greater than about 0.2 mm. In one embodiment, the thickness of the outer coating 4 is about 1 mm. In another embodiment, the thickness of the outer coating 4 is between about 1 mm and 3 mm. In one embodiment, the at least one extension arm 18 is adjustable, such that the length of the at least one extension arm 18 is able to be made shorter or longer. The ability to control the length of the at least one extension arm 18 allows the ultrasonic scanning apparatus 10 to be used for parts 2 having different radii, as it allows the transducer housing assembly 20 to be positioned proximate to parts of different sizes.

In one embodiment, the ultrasonic scanning apparatus 10 includes a plurality of translation stages 16 extending axially downwardly from the ring base 12. By including a plurality of translation stages 16, and therefore a plurality of extension arms 18 attached to transducer housing assemblies 20, the ultrasonic scanning apparatus 10 is able to scan different radial positions of the outer coating 4 simultaneously, and therefore able to more quickly scan the entire circumference of the outer coating 4 of the part 2, or a portion of the circumference of the outer coating 4 of the part 2. Furthermore, in another embodiment, each translation stage 16 includes a plurality of extension arms 18, each attached to a separate transducer housing assembly 20. By including a plurality of extension arms 18, the ultrasonic scanning apparatus 10 is able to scan different axial positions of the outer coating 4 simultaneously, and therefore able to more quickly scan the entirety of the length of the outer coating 4 of the part 2, or a portion of the length of the outer coating 4 of the part 2. Furthermore, this set up allows the ultrasonic scanning apparatus 10 to scan multiple parts 2 at once if the parts are arranged coaxially.

The transducers used in the present invention are operable to operate in pulse-echo mode and/or in through transmission mode. For parts in which there is an outer coating, the transducers are generally operated in pulse-echo mode, in order to capture information about the outer coating at a specific location. Therefore, even in situations in which there are transducers located on opposite sides of the part and emitting ultrasonic waves in opposite directions, each transducer operates independently in pulse-echo mode and the transducers are not communicating in through transmission mode. However, in embodiments wherein the part is a single material, without a distinct outer coating, it is often useful to run the transducers in through transmission mode. Therefore, the present invention should be understood as limiting as to the mode of scanning able to be used by the transducers that are part of the ultrasonic scanning apparatus.

In one embodiment, the ring base 12 includes at least one rotational optical encoder for each translation stage 16. In one embodiment, the at least one rotational optical encoder includes at least one quadrature encoder. In one embodiment, the at least one rotational optical encoder includes at least 1800 counts per revolution (CPR). In one embodiment, the at least one rotational optical encoder includes at least one thru-bore optical encoder and/or at least one hollow bore optical encoder.

The at least one rotational optical encoder is operable to track the change in position of the at least one translation stage 16 within the track of the ring base 12. In one embodiment, the at least one rotational optical encoder automatically transmits angular position data to the processor in real time, allowing the processor to automatically correlate scan data with angular position data. By correlating scan data with angular position data, the processor is better able to generate a 3D mapping of the part 2 being scanned (e.g., the outer coating 4), as each scan image is able to be amalgamated to produce a 3D view. In one embodiment, the ultrasonic scanning apparatus 10 does not include any magnetic encoders. In another embodiment, the ultrasonic scanning apparatus 10 does not include any metal susceptible to an external magnetic field, and is instead composed entirely of plastic, composites, ceramics, diamagnetic metals, and/or other materials that are not attracted by an external magnetic field.

In one embodiment, the at least one translation stage 16 includes a stepper motor and a linear optical encoder. The stepper motor allows the at least one extension arm 18 to be incrementally moved upwardly or downwardly the at least one translation stage 16. The linear optical encoder is operable to track the change in position for each of the at least one extension arm 18 connected to the at least one translation stage 16. In one embodiment, the linear optical encoder automatically transmits linear position data to the processor in real time, allowing the processor to automatically correlate scan data with linear position data. By correlating scan data with linear position data, the processor is better able to generate a 3D mapping of the object being scanned (e.g., the outer coating 4), as each scan image is able to be amalgamated to produce a 3D view. The step size of the stepper motor is generally a known quantity and therefore the relative position of the at least one extension arm 18 is able to be determined by the number of steps moved using the stepper motor. However, the optical encoder helps ensure the accuracy of the step size, which allows the ultrasonic scanning apparatus 10 to maintain a high degree of accuracy with regard to the position of each scan, even if the stepper motor falters in some manner.

Figure 2:
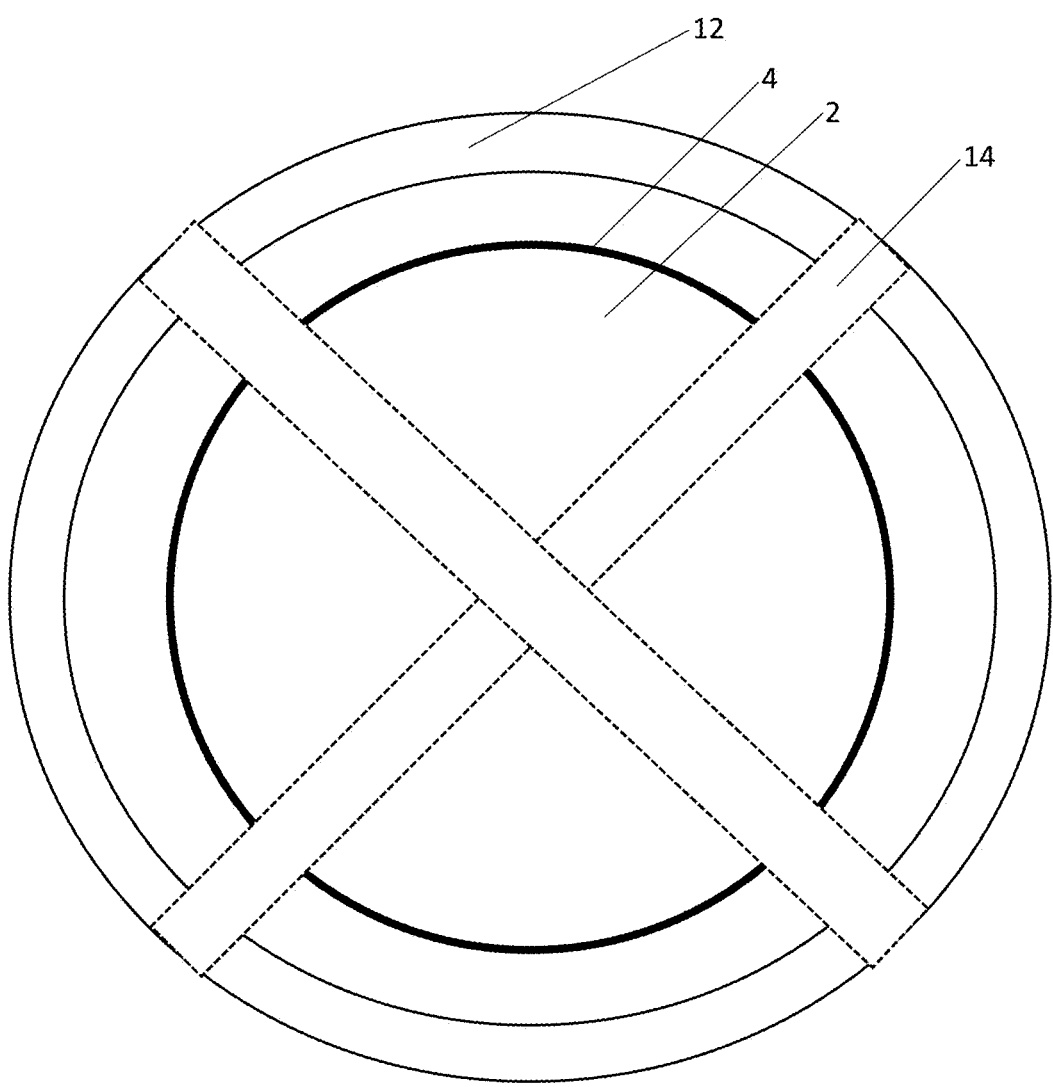
FIG. 2 illustrates a top view of an ultrasonic scanning apparatus according to one embodiment of the present invention.

In one embodiment, the ring base 12 of the ultrasonic scanning apparatus 10 is connected to at least one hanger 14. In one embodiment, as shown in FIGS. 1 and 2, the at least one hanger 14 includes at least one semi-circular arch. In another embodiment, the at least one hanger includes a plurality of suspension cables positioned around the ring base 12. In one embodiment, the at least one hanger 14 is operable to connect to a larger support apparatus designed to hold the weight of the ultrasonic scanning apparatus 10.

In one embodiment, at least one acoustic gel is applied to an outer surface of the outer coating 4 before scanning. The acoustic gel helps to form an acoustic path from the transducer housing assembly to the outer coating such that data from the outer coating 4 is interpretable. Critically, unlike water, which is able to penetrate and potentially damage an electric motor, the acoustic gel is easily applied and removed without risk of permanent damage to the part.

Figure 3:
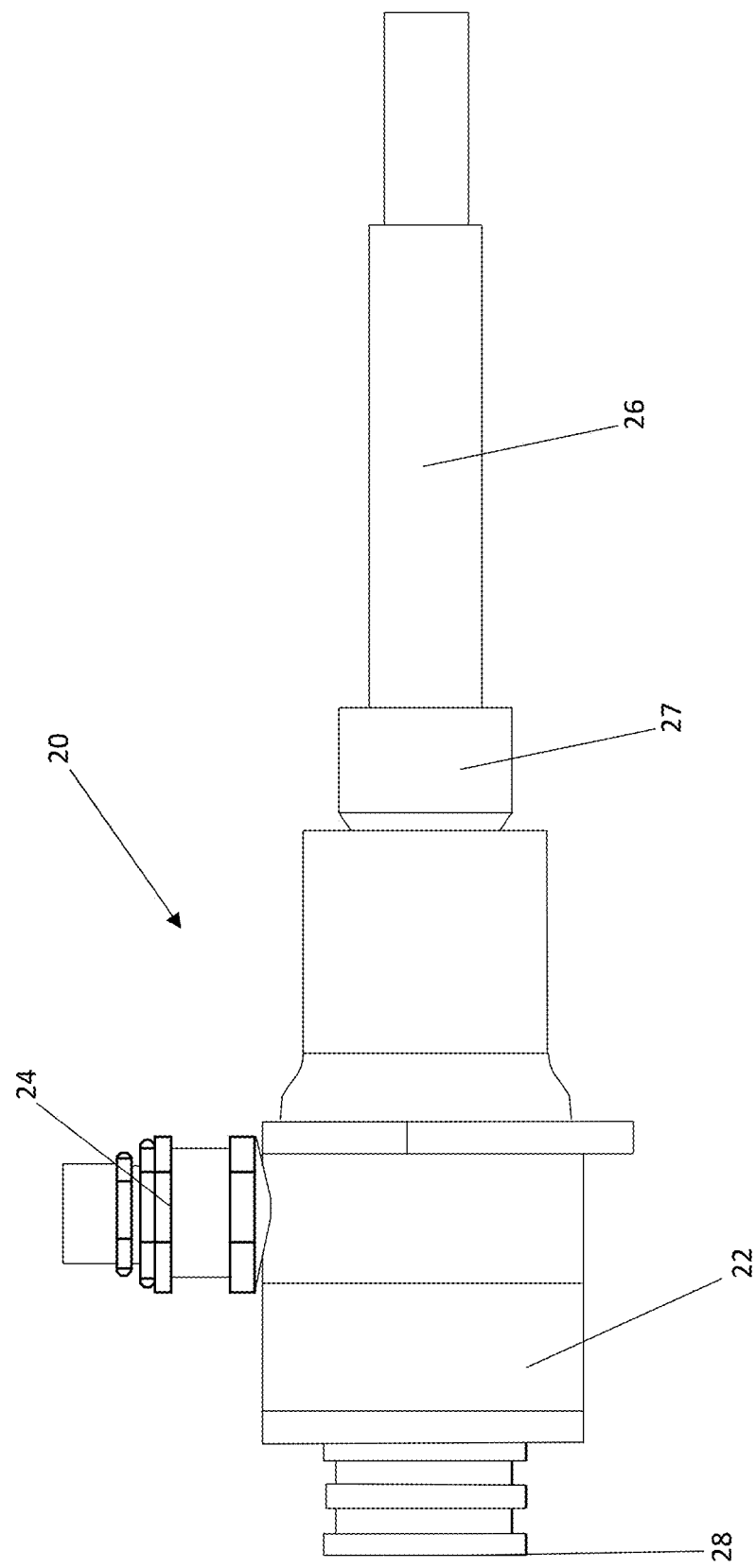
FIG. 3 illustrates a side view of a transducer housing assembly according to one embodiment of the present invention.

FIG. 3 illustrates a side view of a transducer housing assembly according to one embodiment of the present invention. In one embodiment, the transducer housing assembly is a portable transducer housing assembly as described in U.S. patent application Ser. No. 17/091,774, which is incorporated herein by reference in its entirety. The transducer housing assembly 20 includes a central housing 22. The central housing 22 is a hollow piece defining an interior chamber. The central housing 22 includes an opening to a fluid connector 24. The fluid connector 24 is operable to connect to a conduit supplying coupling fluid to the interior chamber of the transducer housing assembly 20. The interior chamber also includes an opening to receive a lens housing 28, which extends outwardly from a front end of the central housing 22. In one embodiment, an opening at the front of the lens housing 28 is covered by a membrane. In one embodiment, the lens housing 28 is fused to the central housing 22. In one embodiment, the index of refraction between the coupling fluid and the membrane is approximately equal to 1. In another embodiment, the index of refraction between the coupling fluid and the membrane is between 0.9 and 1.2. In one embodiment, the membrane is made from AQUALENE and/or a flexible liquid-based silicon. In one embodiment, the membrane has a thickness of about 0.25 mm. In one embodiment, the silicon is a transparent silicon having a specific gravity of about 1.07, a tensile strength of about 7.2 MPa, and a tear resistance of about 112 ppi, in line with HT-6240, offered by STOCKWELL ELASTOMERICS. In one embodiment, the coupling fluid is water.

A coupling element 27 is threadedly connected to a back end of the central housing 22. In one embodiment, the coupling element 16 is a hollow cylinder and an elongate member 26 extends through the coupling element 16 into the interior chamber of the central housing 22. A front end of the elongate member 26 is connected to an ultrasonic transducer. In one embodiment, the elongate member 26 and the coupling element 16 are held together by frictional contact between the outside surface of the elongate member 26 and the interior surface of the coupling element 16. As the elongate member 26 extends through the coupling element 16 into the interior chamber of the central housing 22, the transducer is positioned within the interior chamber of the central housing 22. Therefore, during operation of the transducer housing assembly, the transducer is coupled with the coupling fluid disposed within the interior chamber of the central housing 22. In one embodiment, turning the elongate member 26 relative to the central housing 22 moves the transducer slightly within the interior chamber. Therefore, the elongate member 26 is able to be used to fine tune the distance of the transducer from a test object in order to improve resolution. The elongate member 26 is further operable to engage with and connect to the at least one extension arm 18 of the ultrasonic scanning apparatus 10. Therefore, in one embodiment, the at least one extension arm 18 is operable to turn and thereby move the transducer by turning the elongate member 26 relative to the central housing 22.

In one embodiment, the transducer is a spherically focused transducer. Traditionally, spherically focused transducers have higher spatial resolution than other transducers on the market, but have only been able to be used in immersion tank or in system wherein coupling fluid is continuously sprayed on the object to be scanned. However, because the transducer is disposed within a coupling fluid filled chamber and the membrane of the transducer housing assembly 20 is substantially acoustically transparent to the coupling fluid, the spherically focused transducer is able to be used in the present system without the use of either water jets or an immersion tank.

Figure 4:
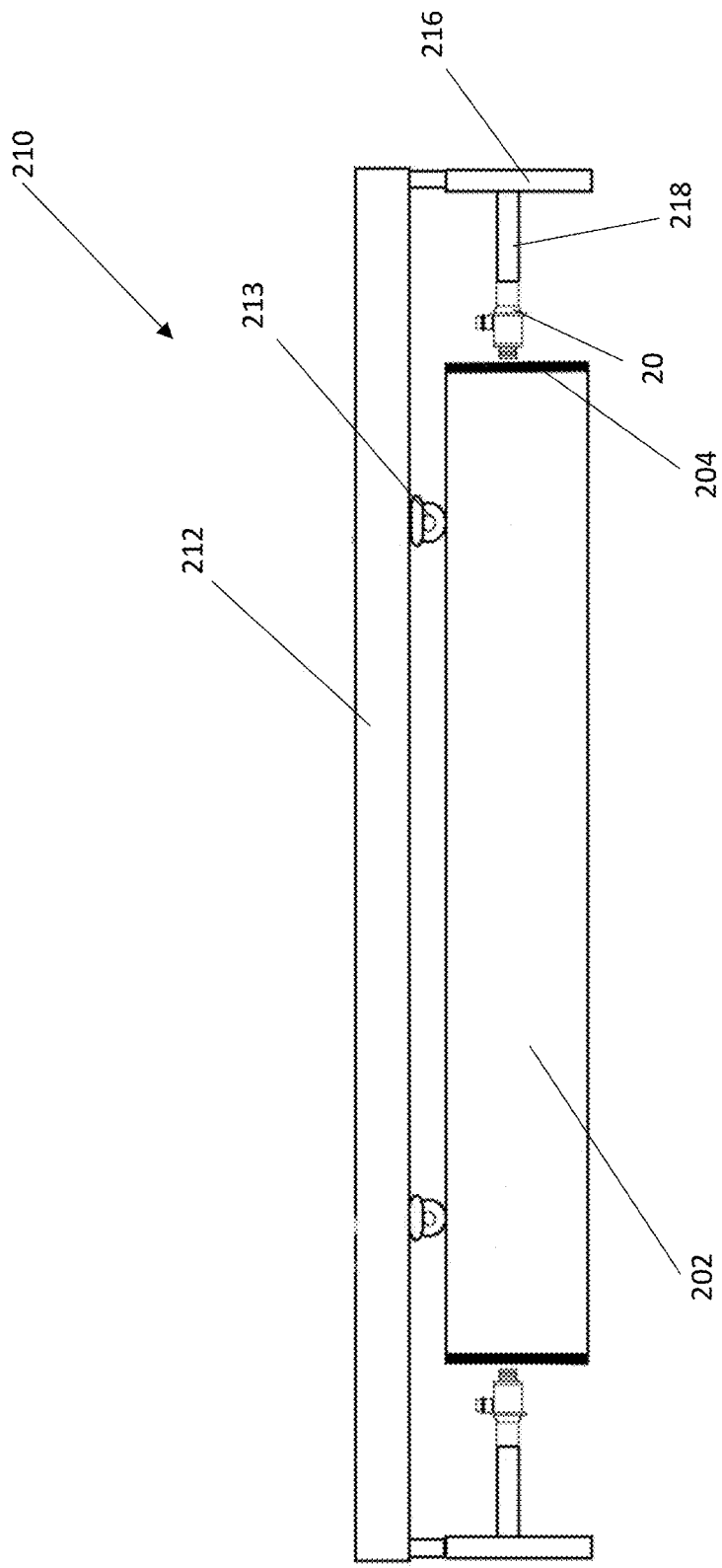
FIG. 4 illustrates a side view of an ultrasonic scanning apparatus according to one embodiment of the present invention.

FIG. 4 illustrates a side view of an ultrasonic scanning apparatus according to one embodiment of the present invention. The ultrasonic scanning apparatus 210 includes a base 212 and a plurality of wheels 213 configured to contact a surface of part 202 having an outer coating 204. The base 212 is connected to at least one translation stage 216. Each of the at least one translation stage 216 is connected to at least one transducer housing assembly 20, which extends from the translation stage 216 inwardly toward the part 202. In one embodiment, the at least one transducer housing assembly 20 is connected to the at least one translation stage 216 through connection to at least one extension arm 218, which extends inwardly from the at least one translation stage 216. In one embodiment, the plurality of wheels 213 allow the base 212 to rotate around the part 202, such that the at least one transducer housing assembly 20 is able to scan a plurality of regions of the outer coating 204 of the part 202. By placing the plurality of wheels 21 directly on a surface of the test object 202, the device does not require a hanger to support the base 212, as in the apparatus shown in FIGS. 1 and 2. Furthermore, the ultrasonic scanning apparatus 210 continues to avoid needing to contact the outer coating 204 of the part 202 at all.

Figure 5:
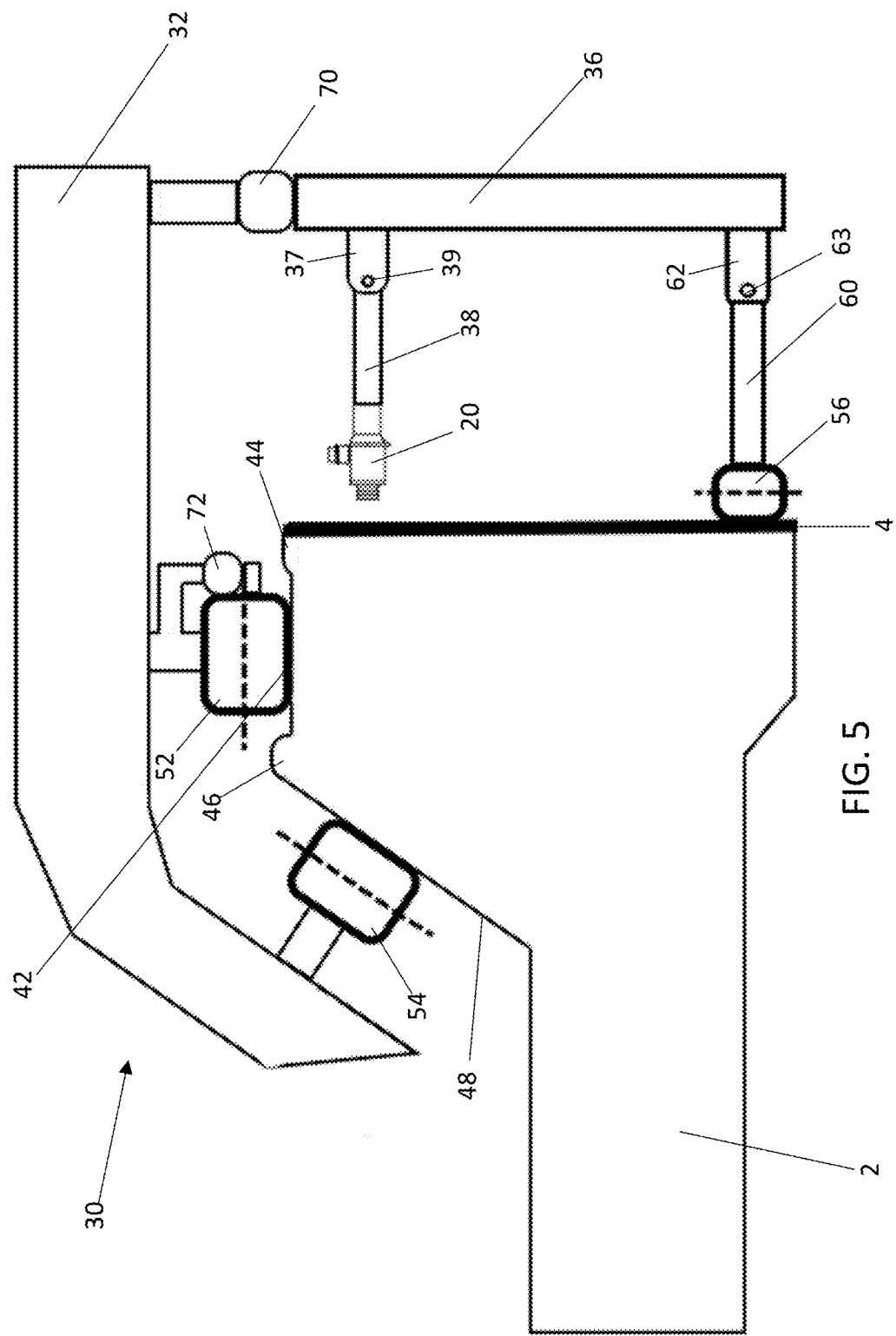
FIG. 5 illustrates a side view of an ultrasonic scanning apparatus according to one embodiment of the present invention.

FIG. 5 illustrates a side view of an ultrasonic scanning apparatus according to one embodiment of the present invention. In one embodiment, the part 2 being scanned includes an outer coating 4. Toward the edge of the part 2, the part increases in thickness at a ramp region 48. Radially outwardly from the ramp region 48, is an area wherein the top of the part 2 has a substantially flat top surface, herein referred to as the flat region 42. Between the ramp region 48 and flat region 42 is a first lip 46, which extends upwardly from the top surface of the part 2. Additionally, the part includes a second lip 44 radially outwardly from the flat region 42, which extends upwardly from the top surface of the part 2.

The ultrasonic scanning apparatus 30 includes a first wheel 52 configured to rest on the flat region 42 of the part 2, and a second wheel 54 configured to rest on the ramp region 48 of the part 2. The first wheel 52 is connected to a motor 72 and an optical encoder 74, which is operable to determine the radial position of the ultrasonic scanning apparatus 30 on the part 2. The first wheel 52 and second wheel 54 are connected via a connector apparatus 32. The connector apparatus 32 is further connected to at least one translation stage 36. At least one extension arm 38 extends radially inwardly from at least one sleeve 37 connected to the at least one translation stage 36. The at least one sleeve 37 includes a locking mechanism 39. When the locking mechanism 39 is engaged, the at least one extension arm 38 is able to move into and out of the at least one sleeve 37. In one embodiment, the locking mechanism 39 includes a pin, and when the pin is depressed, the at least one extension arm 38 is able to move into and out of the at least one sleeve 37. Each of the at least one extension arm 38 is connected to a transducer housing assembly 20, which is configured to be proximate to the outer coating 4 of the part 2. Each of at least one translation stage is connected to a stepper motor 70, which allows the at least one extension arm 38 to move upwardly and downwardly along the at least one translation stage 36 at incremental distances.

At least one stabilization arm 60 extends radially inwardly from at least one stabilization sleeve 62 connected to the at least one translation stage 36. The at least one stabilization sleeve 62 includes a locking mechanism 63. When the locking mechanism 63 is engaged, the at least one stabilization arm 60 is able to move into and out of the at least one stabilization sleeve 62. In one embodiment, the locking mechanism 63 includes a pin, and when the pin is depressed, the at least one stabilization arm 60 is able to move into and out of the at least one stabilization sleeve 62. A stabilization wheel 56 is attached to each of the at least one stabilization arm 60 at an end opposite the end of the at least one stabilization arm 60 connected to the at least one stabilization sleeve 62. The stabilization wheel 56 is configured to contact the outer coating 4 of the part 2. In one embodiment, the stabilization wheel 56 is formed from a soft material, including, but not limited, to polytetrafluoroethylene (PTFE), low-density polyethylene (LDPE), ultrahigh molecular weight polyethylene (UHMWPE), and/or other materials having low roughness and/or a low coefficient of friction. In one embodiment, none of the ultrasonic scanning apparatus 30 is formed from a metal susceptible to an external magnetic field and the ultrasonic scanning apparatus 30 is instead formed entirely from plastic, composites, ceramics, diamagnetic metals, and/or other materials that are not significantly affected by an external magnetic field.

The ultrasonic scanning apparatus 30 is able to be placed on the part without a heavy stabilization apparatus being needed to lift and hold the apparatus above the part 2. The weight of the ultrasonic scanning apparatus 30 is substantially distributed to the part 2 via contact of the first wheel 52 and the second wheel 54. The ultrasonic scanning apparatus 30 is therefore best used for a part 2 where the bulk of the part 2 is not sensitive to pressure, while the outer coating 4 is substantially more sensitive than the rest of the part 2. The stabilization wheel 56 prevents the ultrasonic scanning apparatus 30 from tipping over and falling off the device. Furthermore, even if the ultrasonic scanning apparatus 30 would not otherwise fall off the part 2, the stabilization wheel 56 helps to ensure that the transducer housing assembly 20 remains at a fixed distance from the surface of the outer coating 4 of the part 2. While slight force is applied by the stabilization wheel 56 to the outer coating 4, the force is significantly lower than the force applied by any existing system to a tubular part. Furthermore, because the stabilization wheel 56 is formed from a soft material, such as PTFE, the chances of damage to the outer coating 4 of the part 2 are significantly reduced. Furthermore, the ability to adjust the length of both the at least one extension arm 38 and the at least one stabilization arm 60 allows the ultrasonic scanning apparatus 30 to be used for parts of different sizes.

In one embodiment, the apparatus includes at least one robotic arm attached to at least one portable transducer housing. By pre-programming the at least one robotic arm to the specifications of the arm, the robotic arm is able to trace the surface of the part to thoroughly scan it. In one embodiment, the at least one robotic arm is mounted to a segment of the object to be scanned that is not sensitive to contact.

Figure 6:
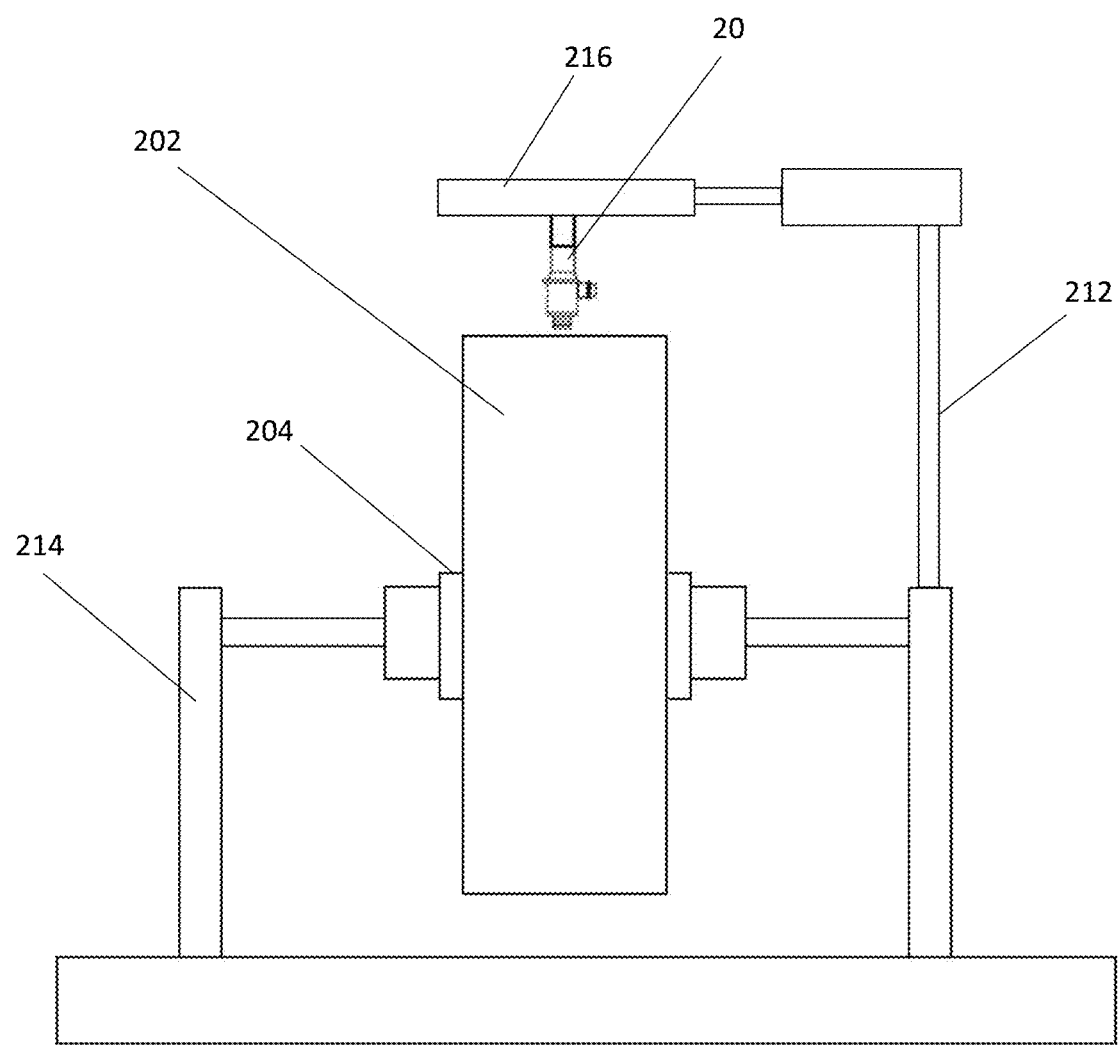
FIG. 6 illustrates a front view of an ultrasonic scanning apparatus with a rotating support according to one embodiment of the present invention.

FIG. 6 illustrates a front view of an ultrasonic scanning apparatus with a rotating support according to one embodiment of the present invention. In one embodiment, an axially symmetric part 202 is held up by a support apparatus 214 attached to one or more attachment points 204 on one or more faces of the axially symmetric part 202. In one embodiment, the one or more attachment points 204 are attached to the support apparatus 214 by at least one magnet, at least one screw, at least one bolt, at least one latch, and/or other mechanical attachment mechanisms known in the art. In one embodiment, the axially symmetric part 202 includes at least two faces connected by a side wall. In one embodiment, the outer surface of the side wall is covered in a sensitive material, wherein the sensitive material is likely to be damaged by substantial mechanical contact with the side wall. In one embodiment, the support apparatus 214 is operable to rotate the axially symmetric part 202 along a central axis. In one embodiment, the rotation is carried out via rotation and/or movement of at least one support bar of the support apparatus 214 attached to the one or more attachment points 204. At least one supporting beam 212 is used to support and/or hold aloft at least one translation stage 216. At least one transducer housing assembly 20 is attached to each of the at least one translation stage 216 and is positioned proximate to the surface of the side wall of the axially symmetric part 202. In one embodiment, the support apparatus 214 includes at least one sensor detecting the rotation of the axially symmetric part 202. In one embodiment, the at least one sensor includes at least one optical encoder.

As the axially symmetric part 202 turns, the at least one transducer housing assembly 20 remains at a substantially fixed position relative to the axially symmetric part 202, such as that it is able to scan the full perimeter of the axially symmetric part 202. In one embodiment, after the at least one sensor detects that the axially symmetric part 202 has rotated through a full rotation, at least one motor attached to the at least one translation stage 216 moves the at least one transducer housing assembly 20 such that the at least one transducer housing assembly 20 is aimed at a different point along the sidewall of the axially symmetric part 202. Therefore, with a sufficient number of rotations, the exact number of which depends upon the thickness of the axially symmetric part 202, the at least one transducer housing assembly 202 is able to scan the full side wall of the axially symmetric part 202.

Figure 7:
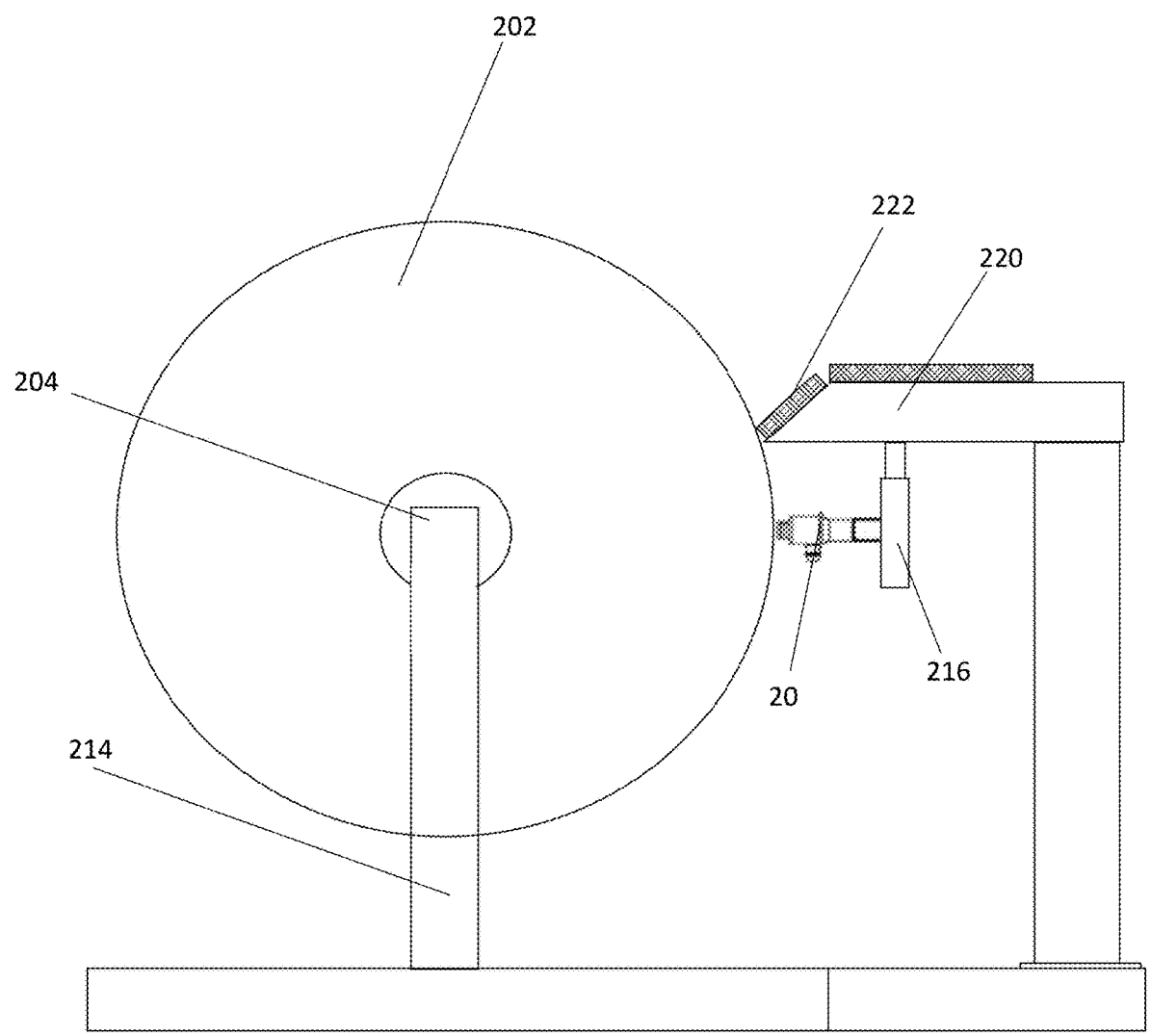
FIG. 7 illustrates a side view of an ultrasonic scanning apparatus with a rotating support and gel applicator according to one embodiment of the present invention.

FIG. 7 illustrates a side view of an ultrasonic scanning apparatus with a rotating support and gel applicator according to one embodiment of the present invention. As in FIG. 6, the axially symmetric part 202 in FIG. 7 is supported by a support apparatus 214 attached to at least one attachment point 204 of the axially symmetric part 202. A transducer housing assembly 20 attached to a translation stage 216 is positioned proximate to the surface of the side wall of the axially symmetric part 202. In one embodiment, a gel applicator 220 is used to apply a uniform coating of acoustic gel 222 to the axially symmetric part 202 as the axially symmetric part 202 rotates. In one embodiment, as shown in FIG. 7, the gel applicator 220 includes a wedge proximate to the surface of the side wall of the axially symmetric part 202. As gel is pushed along the surface of the gel applicator 220, it slides down the wedge, hanging off of it before being picked up by the surface of the side wall of the axially symmetric part 202. Automatically applying the acoustic gel 222 to the surface of the side wall of the axially symmetric part 202 allows the transducer housing assembly 20 to more easily acoustically couple to the surface, without the need for manual addition of the gel, which would require interruption of the rotation of the axially symmetric part 202 and would be more likely to result in uneven gel coating on the surface. One of ordinary skill in the art will appreciate that although FIG. 7 shows the at least one translation stage 216 as being coupled to the gel applicator 220, the at least one translation stage 216 is capable of being held by a number of different means. By way of example, and not of limitation, the at least one translation stage 216 is able to be supported by at least one support beam attached to the support apparatus 214. In another embodiment, the at least one translation stage 216 is supported by at least one support beam not attached to the support apparatus 214 or the gel applicator 220. In yet another embodiment, the at least one translation stage 216 is attached to a robotic arm.

In another embodiment, the gel applicator 220 does not include a wedge element. In one embodiment, the gel applicator 220 includes at least one brush attached to a motor. As the axially symmetric part 202 rotates, the motor causes the at least one brush to swipe back and forth in order to apply acoustic gel to the surface of the side wall of the axially symmetric part 202. In another embodiment, the gel applicator 220 includes at least one nozzle connected to at least one gel containment device and at least one motor. The gel containment device includes at least one compressor (e.g., a piston), which slowly forces out acoustic gel from an open end of the at least one nozzle such that the acoustic gel is exposed to the surface of the axially symmetric part 202. As the axially symmetric part 202 rotates, the motor causes the at least one nozzle to move back and forth to ensure the entire thickness of the surface of the side wall of the axially symmetric part 202 is covered with gel.

Figure 8:
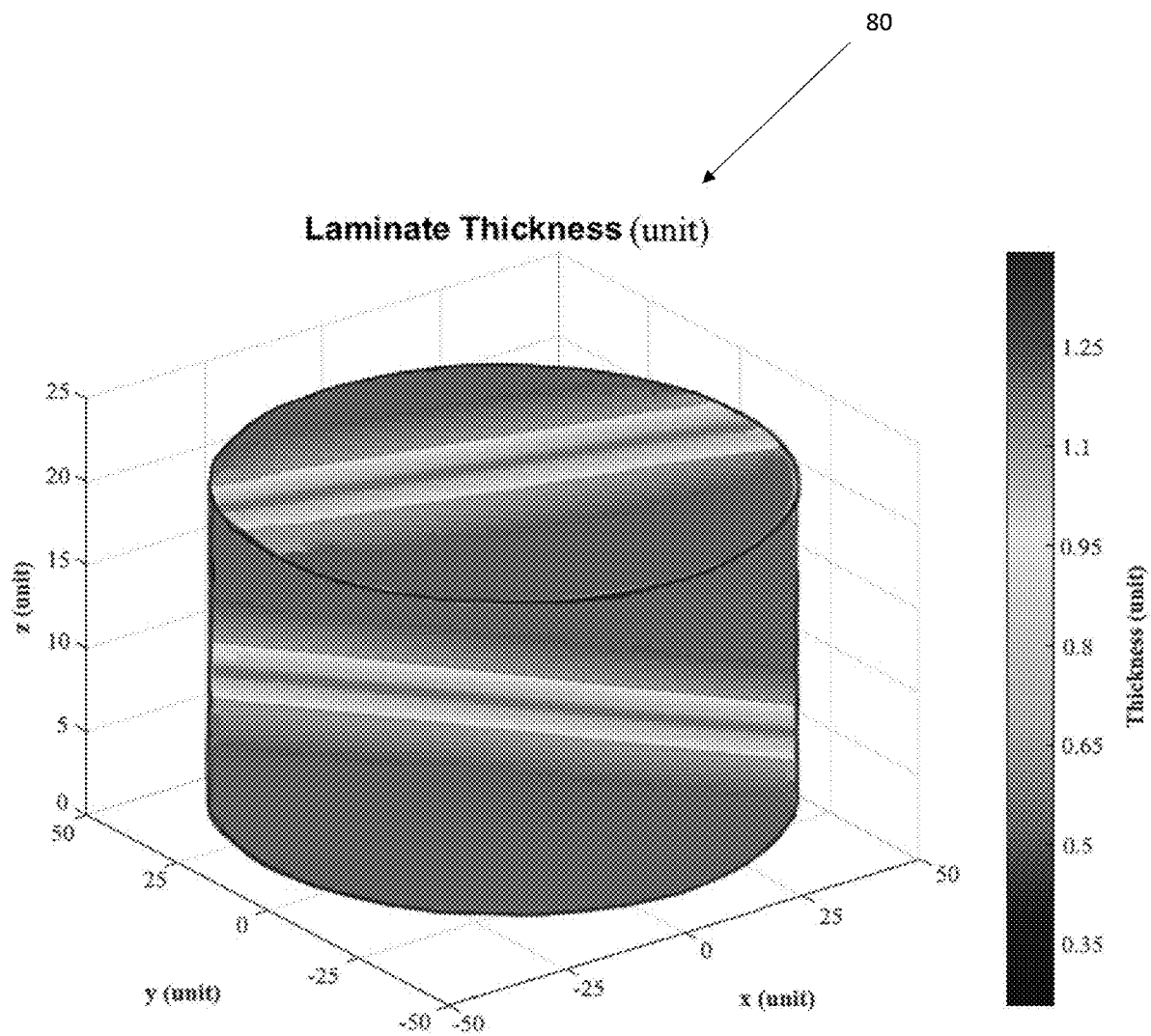
FIG. 8 illustrates a three-dimensional representation of the thickness of a part generated by one embodiment of the present invention.

FIG. 8 illustrates a three-dimensional representation of the thickness of a part generated by one embodiment of the present invention. In one embodiment, the ultrasonic scanning apparatus produces scan data via the transmission and receival of ultrasonic waves from a plurality of regions on the part. In one embodiment, the scan data is correlated with rotational position data and/or axial position data generated by at least one stepper motor and/or at least one optical encoder. By correlating the scan data with position data, a processor connected to the at least one transducer housing assembly is able to generate a three-dimensional (3D) representation 80 of the part. In one embodiment, as shown in FIG. 8, the 3D representation provides for a visual representation of the thickness of an outer coating at each position on the part. In one embodiment, the thickness of the outer coating is represented by differential coloration of the 3D representation. While the embodiment shown in FIG. 8 shows a three-representation with a thin wall, it will be appreciated that, in another embodiment, the 3D representation shows the thickness of the outer coating by provided variations in the surface topology of the 3D representation depending on the thickness of the outer coating. In another embodiment, the 3D representation is used to represent a quality of the outer coating other than thickness, including but not limited to, the type of material constituting the outer coating, the ply orientation of the outer coating, the presence of wrinkles in the outer coating, the presence of foreign objects in the outer coating, and/or the presence of disbanding and/or delamination between the outer coating and the part.

Figure 9:
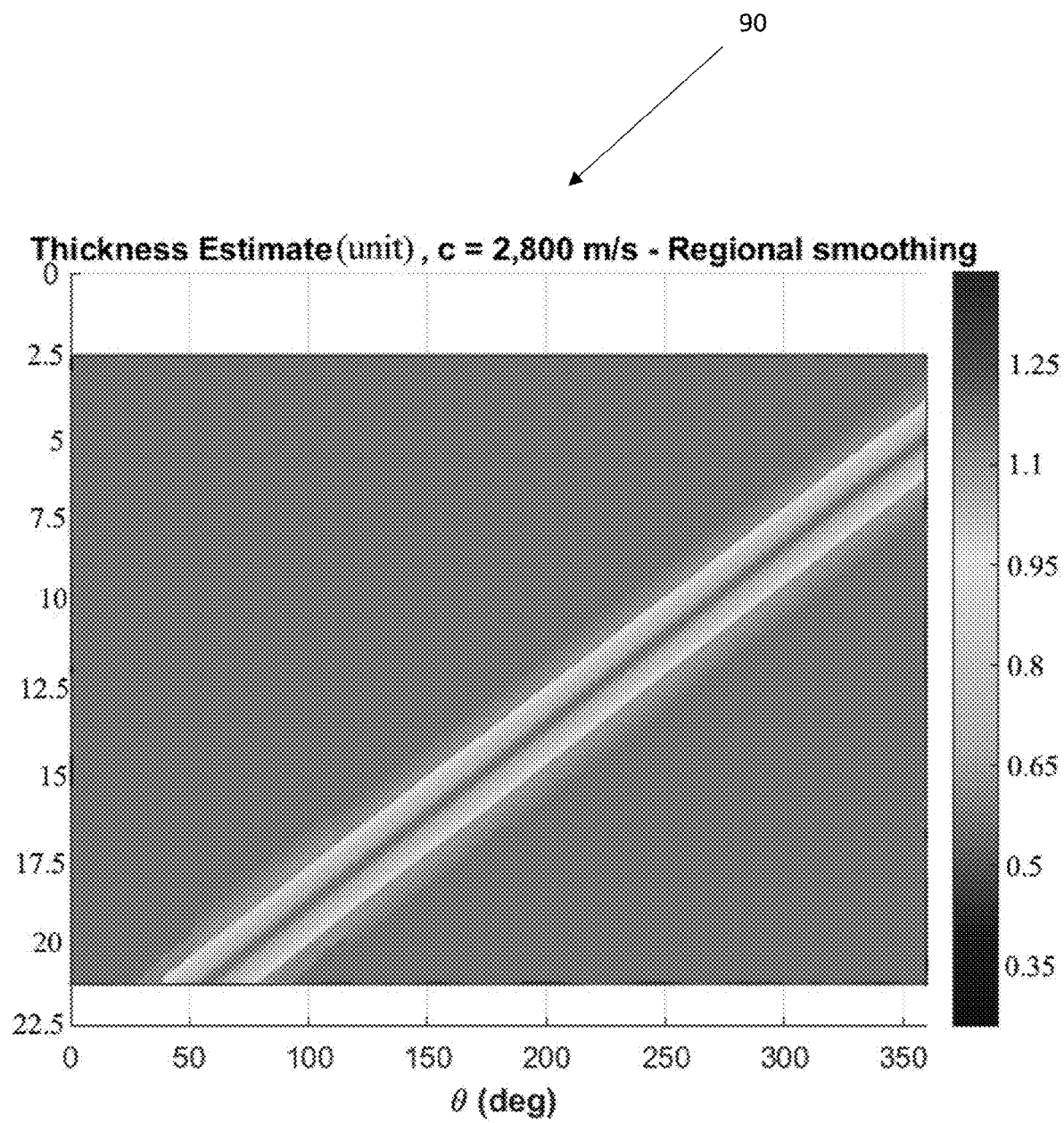
FIG. 9 illustrates a two-dimensional representation of the thickness of a part generated by one embodiment of the present invention.

FIG. 9 illustrates a two-dimensional representation of the thickness of a part generated by one embodiment of the present invention. The processor is also operable to generate a two-dimensional (2D) representation 90 of the part, as shown in FIG. 9. In one embodiment, the ultrasonic scanning apparatus produces scan data via the transmission and receival of ultrasonic waves from a plurality of regions on the part. In one embodiment, the scan data is correlated with rotational position data and/or axial position data generated by at least one stepper motor and/or at least one optical encoder. By correlating the scan data with position data, a processor connected to the at least one transducer housing assembly is able to generate a three-dimensional (2D) representation 90 of the part. In one embodiment, as shown in FIG. 9, the 2D representation provides for a visual representation of the thickness of the outer coating at each position on the part. In one embodiment, the thickness of the outer coating is represented by differential coloration of the 2D representation. In another embodiment, the 2D representation is used to represent a quality of the outer coating other than thickness, including but not limited to, the type of material constituting the outer coating, the ply orientation of the outer coating, the presence of wrinkles in the outer coating, the presence of foreign objects in the outer coating, and/or the presence of disbanding and/or delamination between the outer coating and the part.

Figure 10:
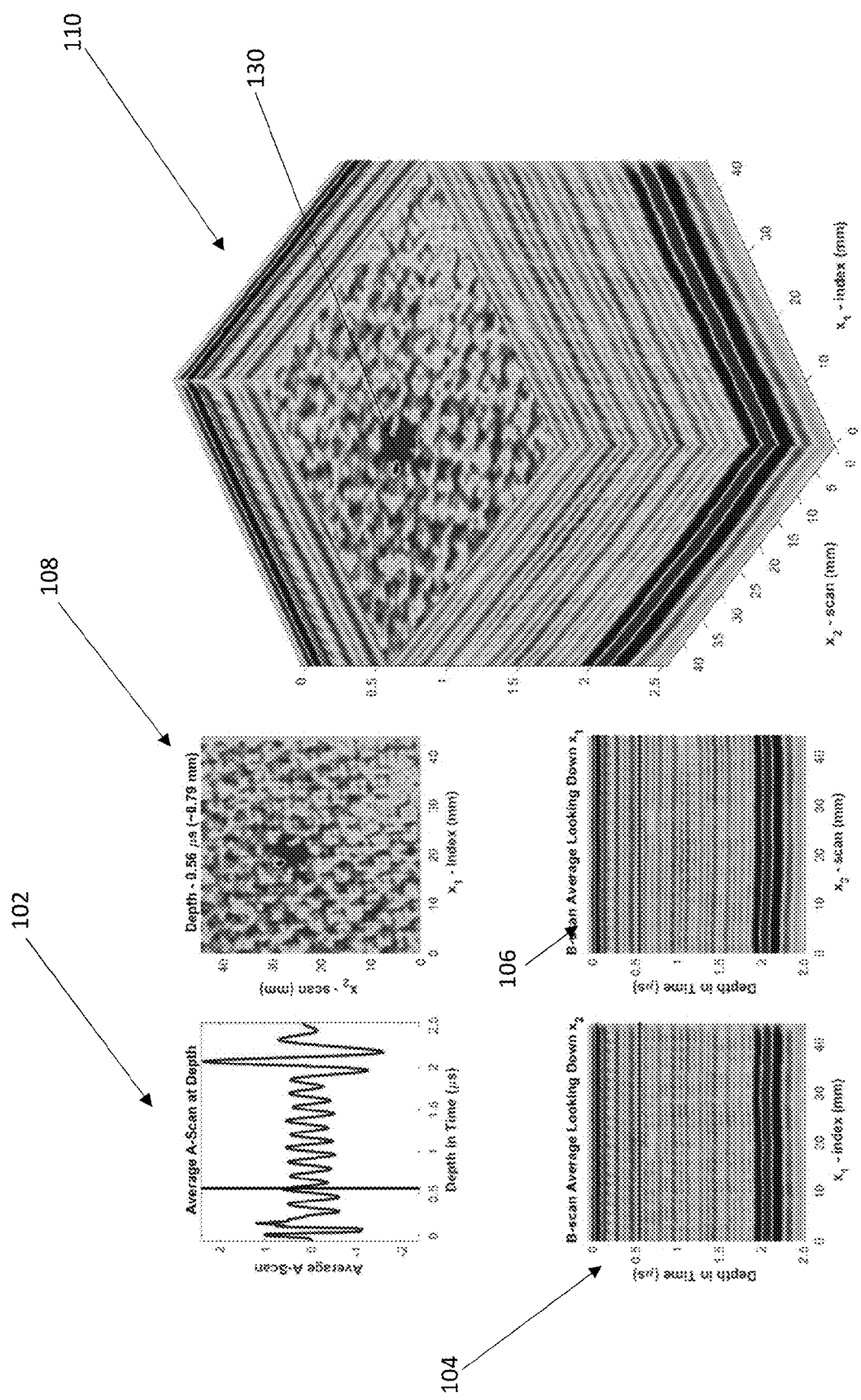
FIG. 10 illustrates a group of graphical representations of a part generated by one embodiment of the present invention.

FIG. 10 illustrates a group of graphical representations of a part provided by one embodiment of the present invention. The transducer in the transducer housing assembly 20 is operable to emit and receive ultrasonic waves to produce ultrasonic scan data. The ultrasonic scan data includes multiple types of scan data, as the transducer emits waves into different sections of the part, such as A-scans, B-scans, and C-scans. An A-scan is formed for each individually scanned point of the part. A-scans typically show a signal amplitude as a function of time, wherein signals appearing later in time are reflected from boundary changes at greater depths in the part and the presence of greater than two signals (more than the initial entry into the part and the reflection off the back wall of the part) indicates the presence of a defect, or internal layering within the part. A-scans can be useful in determining whether a defect or layer boundary is present at a particular point in an object, but lacks specificity regarding the size or type of defect in question and can only characterize one specific area of the part. Unlike other scanning techniques, which use gating in order to retrieve scan data between two preset time points of the scan, the present system is operable to capture and utilize the entire waveform of the scan. Where gating is described in this application, it should be understood to refer to picking out particular regions for analysis after retrieving the full waveform, rather than limiting the waveform of the captured scan data to a particular set of times.

B-scans are constructed as combinations of individual A-scans as an ultrasonic testing device is swept along an axis of the part. As the ultrasonic testing device is moved, the B-scan is able to form a cross-sectional view of the device, indicating at what depth defects are found based on the peaks of the A-scan for each point along the part. This creates a sort of side view of the part, which is useful for providing information regarding impact damage and delaminations.

A C-scan provides a cross-sectional view of the part that is orthogonal to that of the B-scan. C-scans combine A-scans for different X and Y coordinates along a plane to produce a cross sectional view that can provide not only position data for an internal defect or layer, but also an indication of the defect or layer's cross-sectional area at a given depth. C-scans are formed by selecting a gate start time and a gate end time and then obtaining intensity information within the gate region for every A-scan that is taken. Some systems utilize phase array technology with transducers aimed in different directions, such as that the system is able to gain a wider array of A-scans before the transducer is moved across each point of the test area. C-scans are however, two dimensional images and are unable to accurately provide for the depth of a defect or precisely observe defects that would appear more predominately in a view orthogonal to the cross-sections of the C-scans.

As the frequency of the transducer increases, the resolution quality of the transducer increases. In one embodiment, the transducer is fired using a voltage of approximately 200 V, which allows the transducer to operate at high frequencies. However, as the frequency of the transducer increases, the depth of a part visible to the system decreases. In one embodiment, the transducer is able to operate at frequencies between 0.5 MHz and 50 MHz. In another embodiment, the transducer is able to operate at frequencies between 1 and 25 MHz. In yet another embodiment, the transducer is able to operate at frequencies between 5 and 15 MHz. In still another embodiment, the transducer is able to operate between 10 and 15 MHz. In a preferred embodiment, the transducer operates between 7.5 and 15 MHz.

As shown in FIG. 10, the GUI is capable of providing a single view with a corresponding A-scan image 102, B-scan images 104,106, C-scan image 108 and a three-dimensional (3-D) layered image 110, constructed by combining data from corresponding B-scan images 104, 106 and C-scan images 108. The A-scan image 102 represents an average amplitude value for signals returning at a given time. In one embodiment, the A-scan image 102 represents a weighted average amplitude, meaning that the amplitudes of the scans at particular positions in the object contribute more to the final A-scan image 102 than the amplitudes at other positions. As the values on the A-Scan image 102 represent averages, it is unlikely that the A-scan image 102 by itself would be able to show foreign objects or other defects in the part unless the foreign objects or other defects persisted across the entire cross section of the part. However, the difference in amplitudes over time in the A-scan image 102 is useful for characterizing different layers of the laminate or large scale delaminations normal to the surface of the part within the part. A reference line on the A-scan image 102 indicates a depth within the part, which is the same depth at which the C-scan image 108 displays a cross-sectional surface of a layer of the part and is the depth at which the 3-D layered image 110 displays a cross-section of the part.

The B-scan images 104,106 include a first B-scan image 104 showing the cross-section of the part parallel to a first axis and a second B-scan image 106 showing the cross-section of the part parallel to a second axis, such that the first B-scan image 104 and the second B-scan image 106 display cross-sections that are orthogonal to one another. The 3-D layered image 110 includes a top surface equivalent to the C-scan image 108, a first side surface equivalent to the first B-scan image 104, and a second side surface equivalent to the second B-scan image 106. In another embodiment, the system automatically generates a B-scan image of a foreign object 130 and a corresponding depth from the surface of the part for the B-scan image.

As the ultrasonic scanning apparatus is performing the scan, the 3-D layered image 110 appears to increase in depth until the testing is complete. It will be appreciated that the 3-D layered image increasing in depth is not a reflection of the manner in which the scan data is produced, but merely a convenient visual effect for the user. The scan data is produced in a way such that the entire waveform is saved for each A-scan, therefore meaning that the entire range of depths for the part are acquired simultaneously. In one embodiment, after the testing has been completed, a user of the GUI selects a time point, which causes the GUI to display versions of the C-scan image 108 and the 3-D layered image 110 taken during the testing at the selected time point. In one embodiment, the time point is selectable by dragging the reference line on the A-scan image 102. In another embodiment, the user selects the time point by entering in a number value associated with the time point.

In one embodiment, the processor is further operable to automatically detect the presence of a foreign object, characterize barely visible impact damage on the surface of the outer coating, detect areas of incomplete bonding and/or disbanding of the material, detect and characterize both in-plane and out-of-plane wrinkles, and determine a ply orientation for one or more layers of the part and/or outer coating of the part. Each of these functions are described in greater detail in U.S. patent application Ser. No. 17/188,559, which is incorporated herein by reference in its entirety.

Figure 11:
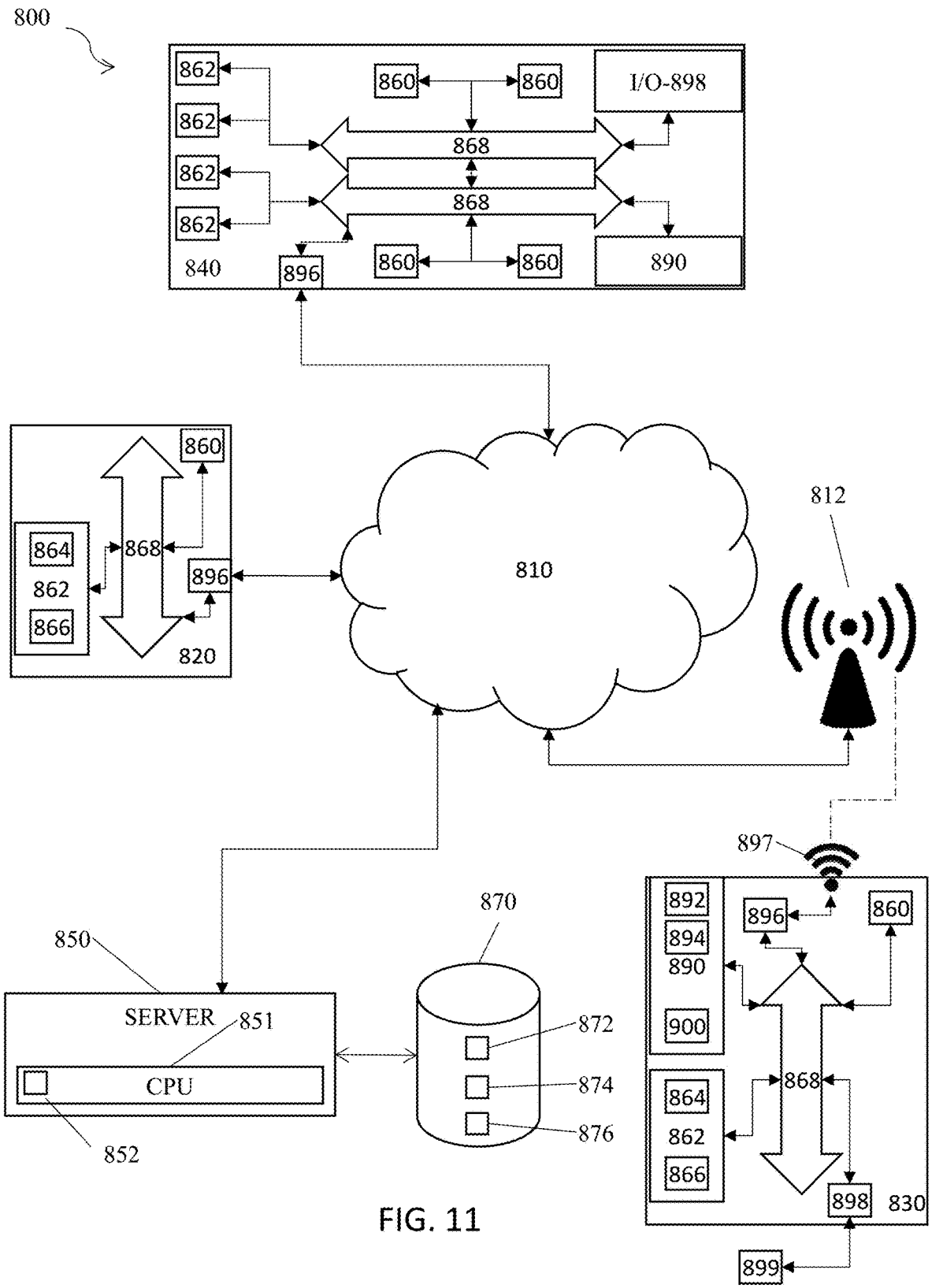
FIG. 11 is a schematic diagram of a system of the present invention.

FIG. 11 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 11, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 11, is operable to include other components that are not explicitly shown in FIG. 11, or is operable to utilize an architecture completely different than that shown in FIG. 11. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. A system for non-destructive testing of a test object, comprising:
   at least one scanner support;
   at least one transducer housing assembly including an interior fluid-filled chamber attached to the at least one scanner support;
   a support apparatus, wherein the support apparatus is operable to support and rotate at least one test object about a central axis of the at least one test object;

wherein the interior fluid-filled chamber includes an ultrasonic transducer operable to emit ultrasonic waves into and receive ultrasonic waves from the at least one test object;

wherein an elongate member is connected to the ultrasonic transducer within the at least one transducer housing assembly and extends through an exterior opening of the at least one transducer housing assembly;

wherein rotation of the elongate member moves the ultrasonic transducer relative to the at least one transducer housing assembly; and wherein the system is operable to scan at least a portion of a side wall of the at least one test object without mechanically contacting the side wall of the at least one test object.

2. The system of claim 1, wherein the support apparatus includes at least one support bar connected to at least one attachment point on the at least one test object, and wherein the at least one support bar is configured to rotate about the central axis of the at least one test object.

3. The system of claim 1, further comprising at least one gel applicator, wherein the at least one gel applicator is operable to apply an acoustic gel to an external surface of the at least one test object, and wherein the at least one gel applicator includes at least one wedge positioned proximate to the at least one test object.

4. The system of claim 3, wherein the at least one scanner support and/or the support apparatus is attached to the at least one gel applicator.

5. The system of claim 1, wherein the at least one transducer housing assembly includes a plurality of transducer housing assemblies, each connected to the at least one scanner support.

6. The system of claim 1, wherein the system does not include ferromagnetic components, and wherein the system does not include a magnetic encoder.

7. The system of claim 1, wherein the ultrasonic transducer is a spherically focused transducer.

8. A system for non-destructive testing of a test object, comprising:
   at least one scanner support;
   at least one transducer housing assembly including an interior fluid-filled chamber attached to the at least one scanner support;
   a support apparatus, wherein the support apparatus is operable to rotate at least one test object about a central axis of the at least one test object;
   at least one gel applicator positioned proximate to the at least one test object, wherein the at least one gel applicator is operable to apply acoustic gel to an external surface of the at least one test object;
   wherein the interior fluid-filled chamber includes an ultrasonic transducer operable to emit ultrasonic waves into and receive ultrasonic waves from the at least one test object;
   wherein an elongate member is connected to the ultrasonic transducer within the at least one transducer housing assembly and extends through an exterior opening of the at least one transducer housing assembly; and
   wherein rotation of the elongate member moves the ultrasonic transducer relative to the at least one transducer housing assembly.

9. The system of claim 8, wherein the support apparatus includes at least one support bar connected to at least one attachment point on the at least one test object, and wherein the at least one support bar is configured to rotate about the central axis of the at least one test object.

10. The system of claim 8, wherein the at least one gel applicator includes at least one wedge positioned proximate to the at least one test object.

11. The system of claim 8, wherein the at least one gel applicator includes at least one gel containment device operable to contain the acoustic gel, at least one nozzle providing an opening to the at least one gel containment device, and at least one piston within the at least one gel containment device, and wherein the at least one piston is operable to force the acoustic gel out of the at least one gel containment device through the at least one nozzle onto the at least one test object.

12. The system of claim 11, wherein the at least one nozzle is connected to at least one motor and is operable to move along at least one axis.

13. The system of claim 8, wherein the at least one gel applicator includes at least one sweeping element attached to at least one motor, wherein the at least one motor is operable to cause the at least one sweeping element to sweep across the at least one test object to apply the acoustic gel to the external surface of the at least one test object.

14. The system of claim 8, further comprising at least one optical encoder operable to detect rotation of the at least one test object to produce rotational position data.

15. The system of claim 8, wherein the system does not include ferromagnetic components, and wherein the system does not include a magnetic encoder.

16. The system of claim 8, wherein the ultrasonic transducer is a spherically focused transducer.

17. A system for non-destructive testing of a test object, comprising:
   at least one scanner support;
   a phased array apparatus of ultrasonic transducers attached to the at least one scanner support;
   wherein at least one ultrasonic transducer of the phased array apparatus of ultrasonic transducers is contained in at least one transducer housing assembly, wherein the at least one transducer housing assembly includes an interior fluid-filled chamber attached to the at least one scanner support;
   a support apparatus, wherein the support apparatus is operable to rotate at least one test object about a central axis of the at least one test object;
   wherein the support apparatus includes at least one support bar connected to at least one attachment point on the at least one test object, and wherein the at least one support bar is configured to rotate about the central axis of the at least one test object;
   wherein at least one stabilization wheel is attached to the at least one scanner support, wherein the at least one stabilization wheel contacts an outer surface of the at least one test object;
   wherein an elongate member is connected to the at least one ultrasonic transducer within the at least one transducer housing assembly and extends through an exterior opening of the at least one transducer housing assembly; and
   wherein rotation of the elongate member moves the at least one ultrasonic transducer relative to the at least one transducer housing assembly.

18. The system of claim 17, further comprising at least one gel applicator, wherein the at least one gel applicator is operable to apply an acoustic gel to an external surface of the at least one test object, and wherein the at least one gel applicator includes at least one wedge positioned proximate to the at least one test object.

19. The system of claim 17, wherein the system does not include ferromagnetic components, and wherein the system does not include a magnetic encoder.

20. The system of claim 17, further comprising at least one gel applicator positioned proximate to the at least one test object, wherein the at least one gel applicator is operable to apply acoustic gel to an external surface of the at least one test object.

* * * * *